United States Patent
Kuthan et al.

(10) Patent No.: US 9,769,053 B2
(45) Date of Patent: Sep. 19, 2017

(54) METHODS, SYSTEMS, AND COMPUTER READABLE MEDIA FOR IMPLEMENTING A POLICY FOR A ROUTER

(75) Inventors: Jiri Kuthan, Berlin (DE); Miklós Tirpák, Tapolca (HU)

(73) Assignee: TEKELEC GLOBAL, INC., Morrisville, NC (US)

(*) Notice: Subject to any disclaimer, the term of this patent is extended or adjusted under 35 U.S.C. 154(b) by 1412 days.

(21) Appl. No.: 12/512,965

(22) Filed: Jul. 30, 2009

(65) Prior Publication Data

US 2010/0027554 A1 Feb. 4, 2010

Related U.S. Application Data

(60) Provisional application No. 61/084,988, filed on Jul. 30, 2008.

(51) Int. Cl.

| | |
|---|---|
| *G06F 15/16* | (2006.01) |
| *H04L 12/701* | (2013.01) |
| *H04L 29/12* | (2006.01) |
| *H04L 12/24* | (2006.01) |
| *H04L 12/771* | (2013.01) |
| *H04L 12/813* | (2013.01) |
| *H04L 29/08* | (2006.01) |
| *H04L 29/06* | (2006.01) |

(52) U.S. Cl.
CPC ........ *H04L 45/00* (2013.01); *H04L 29/12801* (2013.01); *H04L 41/0893* (2013.01); *H04L 45/56* (2013.01); *H04L 47/20* (2013.01); *H04L 61/6004* (2013.01); *H04L 67/14* (2013.01); *H04L 67/146* (2013.01); *H04L 41/22* (2013.01); *H04L 65/1006* (2013.01)

(58) Field of Classification Search
CPC .. H04L 41/0893; H04L 63/0227; H04L 41/22
USPC ......................................................... 709/223
See application file for complete search history.

(56) References Cited

U.S. PATENT DOCUMENTS

| | | | | |
|---|---|---|---|---|
| 5,798,757 A | * | 8/1998 | Smith ....................... | G06F 8/33 |
| | | | | 715/709 |
| 6,484,261 B1 | * | 11/2002 | Wiegel ............................ | 726/11 |
| 7,088,728 B2 | | 8/2006 | Delaney et al. | |
| 7,117,172 B1 | * | 10/2006 | Black .............................. | 705/35 |
| 7,966,654 B2 | * | 6/2011 | Crawford ........................ | 726/11 |
| 8,499,331 B1 | * | 7/2013 | Yehuda et al. ..................... | 726/1 |

(Continued)

OTHER PUBLICATIONS

"Tekelec TekCore™ Selected as Reference CSCF for IMS Forum's Inaugural 'IMS Plugfest'," Business Wire (Dec. 4, 2006).

(Continued)

*Primary Examiner* — John MacIlwinen
(74) *Attorney, Agent, or Firm* — Jenkins, Wilson, Taylor & Hunt, P.A.

(57) ABSTRACT

Methods, systems, and computer readable media for implementing a policy for a router are disclosed. One method includes providing a meta administrator interface configured to facilitate the specification of one or more rules that form a policy definition. The method further includes automatically generating, based on the policy definition, an administrator interface for inputting rule data associated with the policy definition. Even further, the method includes storing the input rule data in one or more data structures associated with a router.

27 Claims, 15 Drawing Sheets

(56) References Cited

U.S. PATENT DOCUMENTS

| | | |
|---|---|---|
| 8,554,928 B2 | 10/2013 | Craig et al. |
| 2003/0033398 A1* | 2/2003 | Carlson et al. ............... 709/223 |
| 2005/0198283 A1* | 9/2005 | Ramamoorthy et al. ..... 709/225 |
| 2006/0114932 A1* | 6/2006 | Cai ........................ H04L 12/14 |
| | | 370/466 |
| 2006/0155852 A1* | 7/2006 | Mayer ............... G06F 17/30867 |
| | | 709/227 |
| 2008/0216148 A1* | 9/2008 | Bienek et al. .................... 726/1 |
| 2008/0244723 A1* | 10/2008 | Brewster et al. ............... 726/11 |
| 2008/0256593 A1* | 10/2008 | Vinberg et al. ................... 726/1 |
| 2008/0282313 A1* | 11/2008 | Diaz-Cuellar et al. ............ 726/1 |
| 2009/0052442 A1* | 2/2009 | Chen et al. ................... 370/389 |

OTHER PUBLICATIONS

"Tekelec Announces TekCore IMS Core Platform; CSCF Capabilities Evolve EAGLE(R) 5 ISS for Delivery of IMS Services Today," Business Wire, GLOBALCOMM 2006 (Jun. 5, 2006).

\* cited by examiner

Description: [          ]
Policy Direction:  ⦿ Callee    Execution Order:  ⦿ Pre-rules          ← name of the feature
                   ○ Caller                      ○ Domain-depend feature  ← domain dependency
                   ○ No profile                  ○ Post-rules
Finish When Found: ☐           Execution Trigger: [After callee's domain and user identification ▼]  ← triggering point
Forward:           ☐           Execution Priority: [0]

Filters                                                                  ← order of features
  Index  Group by
  ☐      ☐        name: [          ] [@from.uri.user ▼] [= ▼] [string ▼] [          ] [up] [down] [delete]
  ☐               name: [          ] [@ruri.user ▼] [= ▼] [tel_nr ▼] [          ] [up] [down] [delete]
[Add]

Action                                                                   ← inbound/outbound domain and user profile
  ☐ Strip  ☐ Prefix  ☐ Log  ☐ Reply  ☐ Delete HF  ☐ Add HF
  ☐ Update R-URI-User  ☐ Update R-URI-Host  ☐ Set destination URI
set AVPs: [Add AVP]

By checking this checkbox you approve that definition of feature is finished and administrators could    ← final actions
specify rules within this feature. After approving feature to use you will not be able to change structure
of feature any more! Almost all fields will be disabled!
  ☐ Ready to use

[Save]                                                          [Cancel]

- Description: [____]
- Policy Direction: ⦿ Callee  Execution Order: ⦿ Pre-rules
  - ○ Caller                    ○ Domain-depend feature
  - ○ No profile                ○ Post-rules
- Finish When Found: ☐       Execution Trigger: [After callee's domain and user identification ▼]
- Forward: ☐                  Execution Priority: [0]

Filters

Index  Group by
☐      ☐       name: [@from.uri.user_____] [up] [down] [▼] [==▼] [string ▼] [delete]
☐      ☐       name: [@uri.user_____] [up] [down] [▼] [=^▼] [tel_nr ▼] [delete]

[ Add ]

460

Action
- ☐ Strip  ☐ Prefix  ☐ Log  ☐ Reply  ☐ Delete HF  ☐ Add HF
- ☐ Update R-URI-User  ☐ Update R-URI-Host  ☐ Set destination URI set AVPs: [ Add AVP ]

*By checking this checkbox you approve that definition of feature is finished and administrators could specify rules within this feature. After approving feature to use you will not be able to change structure of feature any more! Almost all fields will be disabled!*

☐ Ready to use

[Save]                                                                               [Cancel]

Labels (pointing into the form):
- name of the criteria
- part of SIP message, global/domain/user attribute, or result of previous feature
- comparison method
- value type
- group the administration by the first field
- performance settings

IF  country_code  IS  DE  ▼  AND
    phone_number  MATCH  ^00[1-9][0-9]*$

THEN
    Strip: 2  Prefix: +
    transformation_name  German international

Formatting string wizard

[Save]  [Cancel]

conditions and actions that were defined by the meta administrator

List of rules within the number normalization feature:

| country_code | phone_number | Strip | Prefix | transformation_name | | |
|---|---|---|---|---|---|---|
| US | ^011[0-9]*$ | 3 | + | US-international | edit | delete |
| US | 1[0-9]{10} | 0 | + | US domestic | edit | delete |
| DE | ^00[1-9][0-9]*$ | 2 | + | German international | edit | delete |
| DE | ^0[1-9][0-9]* | 1 | +49 | German national | edit | delete |

- 450 —
  - Description: [Origin Based Routing]
  - Policy Direction: ○ Callee  Execution Order: ○ Pre-rules
    - ○ Caller                    ○ Domain-depend feature  — check the feature at the beginning of the routing process
    - ⊙ No profile               ○ Post-rules
  - Finish When Found: ☑  Execution Trigger: [Initial request processing policy] — 502
  - Forward: ☑              Execution Priority: [0]

- 460 —
  - Filters
  - Index  Group by
  - ☑  ☐  name: [source IP address]  [up] [down]
    - 508 — [@src:ip] [▶] [ == ▶] [ip_address ▶] [delete]  — look-up the source IP address
  - ☐  ☐  name: [method type]  [up] [down]
    - 510 — [@method] [▶] [ =~ ▶] [string ▶] [delete]  — check the method type
  - [ Add ]

- 470 —
  - Action
  - ☐ Strip  ☐ Prefix  ☐ Log  ☐ Reply  ☐ Delete HF  ☑ Add HF  — add a new header to the request
  - ☐ Update R-URI-User  ☑ Update R-URI-Host  ☐ Set destination URI  — rewrite the host part of the request URI
  - set AVPs: [ Add AVP ]

- 410 —
  - *By checking this checkbox you approve that definition of feature is finished and administrators could specify rules within this feature. After approving feature to use you will not be able to change structure of feature any more! Almost all fields will be disabled!*
  - ☑ Ready to use

[Save]                                                    [Cancel]

FIG. 8

- separate administration for each domain
- caller is identified before the feature is examined
- look-up the user part of request URI with longest-prefix match
- add a new header to the request
- set the gateway name

412

IF *called number* BEGINS WITH [+351]
THEN
Add Header: [Destination: international] Formatting string wizard
Destination gateway: [west_europe] Formatting string wizard

[Save] [Cancel]

Feature least_coast_routing:

select domain: [test1.iptel.org ▼] [Select]

| called number | Add Header | destination gateway | | |
|---|---|---|---|---|
| +1 | Destination: International | usa | edit | delete |
| +420 | Destination: National | local | edit | delete |
| +33 | Destination: International | west_europe | edit | delete |
| +351 | Destination: International | west_europe | edit | delete |

FIG. 9 check the feature after the gateway name has been set look-up the gateway name set the destination URI, and forward the request Description: [LCR gateways]
Policy Direction: ○ Callee  Execution Order: ⦿ Pre-rules
⦿ Caller                    ○ Domain-depend feature
○ No profile                ○ Post-rules
Finish When Found: ☑  Execution Trigger: [After callee's domain and user identification ▼]
Forward: ☑            Execution Priority: [0]

Filters
Index  Group by
☑      ☐ name: [gateway name]  [up] [down]        [delete]
      [LAVP.dst_gw]  [▼] [==▼] [string ▼]

[ Add ]

Action
☐ Strip  ☐ Prefix  ☐ Log  ☐ Reply  ☐ Delete HF  ☐ Add HF
☐ Update R-URI-User  ☐ Update R-URI-Host  ☑ Set destination URI set AVPs: [ Add AVP ]

By checking this checkbox you approve that definition of feature is finished and administrators could specify rules within this feature. After approving feature to use you will not be able to change structure of feature any more! Almost all fields will be disabled!

☑ Ready to use

[Save]                                                    [Cancel]

IF gateway_name IS [usa]
THEN
Destination URI: [sip:10.0.0.1:1:5070]

[Save]  [Cancel]

Feature LCR gateways:

| gateway name | Destination URI | | |
|---|---|---|---|
| usa | sip:10.0.0.1:5070 | edit | delete |
| local | sip:localgw:iptel.org | edit | delete |
| west_europe | sip:10.0.0.2 | edit | delete |

METHODS, SYSTEMS, AND COMPUTER READABLE MEDIA FOR IMPLEMENTING A POLICY FOR A ROUTER

RELATED APPLICATIONS

This application claims the benefit of U.S. Provisional Patent Application Ser. No. 61/084,988 filed Jul. 30, 2008; the disclosure of which is incorporated herein by reference in its entirety.

TECHNICAL FIELD

The subject matter disclosed herein relates to network policies. More particularly, the subject matter disclosed herein relates systems, methods, and computer program products for implementing a policy on a router.

BACKGROUND

Communication networks provide a means by which various forms of communication, such as voice calls, text messages, and e-mails, may be sent from a sender to a receiver. Such networks include, among others, Public Switched Telephone Networks (PSTN), Global System for Mobile communication (GSM) networks, and IP Multimedia Subsystem (IMS) networks, all of which are well known in the art. Important functions of these networks include allowing or refusing access to the networks and routing communications to their proper destinations while heeding network and user preferences. Network policies establish rules to be applied by a network to ensure that such security and routing functions are executed properly. However, with the rapid evolution of the networks and especially features provided by the networks, existing policies quickly become outdated. Thus, the evolving networks constantly demand new and updated policies.

Developing and implementing a new policy requires a significant amount of time and money. FIG. 1 illustrates a typical development cycle 100 for the development and implementation of a new policy. In this example, a new feature for a network is requested in step 102. Accordingly, in step 104, a design team works to develop a new policy, or set of rules, that when implemented will provide the requested feature. The design stage is often complex and time-consuming, requiring developmental meetings among engineers, presentations to managers, and, finally, approval. Once the design stage is complete, the new policy is then implemented in step 106. Implementation may require database schema changes, network signaling development, and network Operations, Administration, and Maintenance (OAM) development. After the new policy is implemented, it must be tested in step 108 to ensure proper performance and compatibility with the network. If testing is not completed successfully, it will likely be necessary to return to the design stage (step 104) or implementation stage (step 106). Finally, once testing is successfully completed, a network provider or other entity performs the provisioning stage in step 110, whereby the network provider provisions, on network nodes, such as routers, data necessary for the new policy.

The development cycle 100 outlined above illustrates the great length of time required for developing and implementing a new policy. As the increasing rate of evolution of the networks demands new policies at a faster rate, development cycle 100 is clearly too slow. The slow development process coupled with the rapid evolution of the networks imposes significant burdens on everyone involved with the development and upkeep of the networks. In addition, the traditional development cycle 100 is not cost efficient. The cycle 100 requires numerous professionals with a detailed understanding of the networks to develop and implement new policies. Furthermore, due to the length of the development, once a policy is finally implemented it may have a very short lifetime before it also becomes outdated. Finally, the cycle 100 requires a new policy to pass through many hands, and thus is very error prone. Errors in the development cycle 100 are also very costly to correct.

Accordingly, in light of these difficulties, there exists a need for methods, systems, and compute readable media for implementing a policy for a router.

SUMMARY

The subject matter described herein relates to methods, systems, and computer readable media for implementing a policy for a router. According to one aspect, a method for implementing a policy for a router is provided. The method includes providing a meta administrator interface configured to facilitate the specification of one or more rules that form a policy definition. Furthermore, the method includes automatically generating, based on the policy definition, an administrator interface for inputting rule data associated with the policy definition. Even further, the method includes storing the input rule data in one or more data structures associated with a router.

According to another aspect, a system for implementing a policy on a router is provided. The system includes a meta administrator interface configured to facilitate the specification of one or more rules that form a policy definition. Furthermore, the system includes an administrator interface automatically generated based on the policy definition and configured to facilitate the input of rule data associated with the policy definition. The administrator interface automatically populates one or more data structures associated with a router with the input rule data.

The subject matter described herein for implementing a policy for a router may be implemented using a computer readable medium having stored thereon computer executable instructions that when executed by the processor of a computer control the computer to perform steps. Exemplary computer readable media suitable for implementing the subject matter described herein include chip memory devices, disk memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawings of which:

FIGS. 4B-4D are computer screen shots illustrating exemplary components of a meta-administrator interface according to an embodiment of the subject matter described herein;

FIG. 4E is an example of an automatically generated administrator interface according to an embodiment of the subject matter described herein;

FIG. 5 is a computer screen shot illustrating a meta administrator interface used to facilitate a meta administrator in forming the policy definition for an origin-based routing feature in accordance with an embodiment of the subject matter disclosed herein;

FIG. 8 is a computer screen shot of a meta administrator interface where a policy is defined for request-URI to gateway name mapping according to an embodiment of the subject matter described herein;

FIG. 9 is an automatically generated administrator interface corresponding to the meta administrator interface example in FIG. 8;

FIG. 10 illustrates a meta administrator interface used to generate a gateway name to SIP URI mapping according to an embodiment of the subject matter described herein; and FIG. 11 illustrates an automatically generated administrator interface corresponding to the meta administrator interface in FIG. 10.

DETAILED DESCRIPTION

In the following detailed description of embodiments of the subject matter described herein, numerous specific details are set forth in order to provide a more thorough understanding of the subject matter described herein. However, it will be apparent to one of ordinary skill in the art that the subject matter described herein may be practiced without these specific details.

Figure 1:
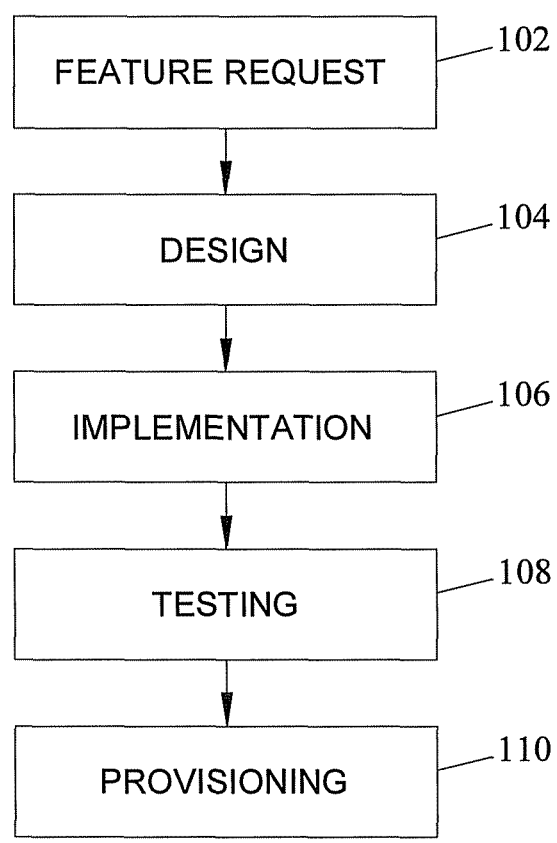
FIG. 1 is a flow chart illustrating an exemplary development cycle for the development and implementation of a new policy.
Figure 2:
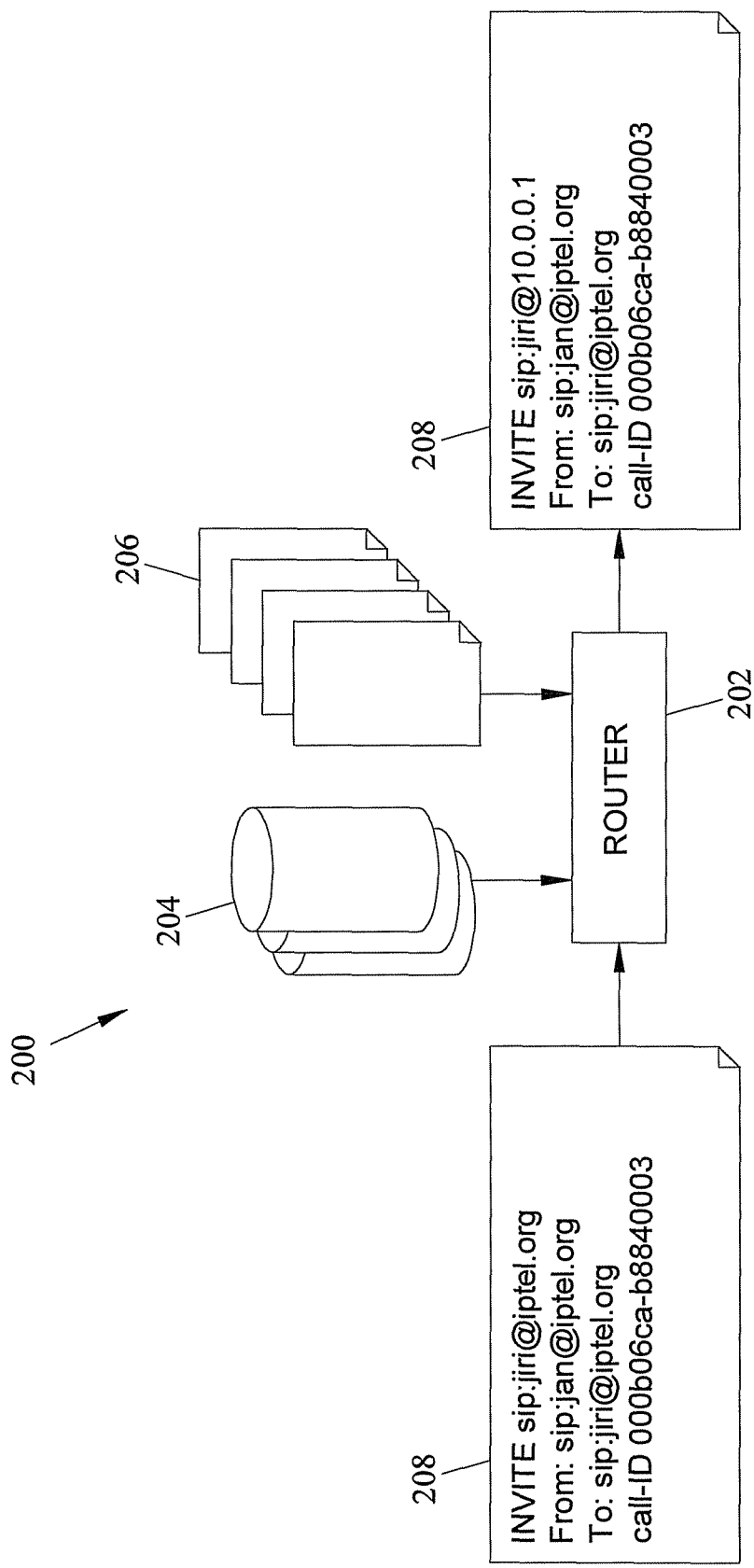
FIG. 2 is a block diagram illustrating a routing system able to use policies generated in accordance with one or more embodiments of the subject matter described herein.

In accordance with the subject matter disclosed herein, systems, methods, and computer program products for implementing a policy for a router are described. FIG. 2 illustrates a routing system 200 in accordance with one or more embodiments of the subject matter described herein. Routing system 200 is a part of a communications network. For example, routing system 200 may be a part of a Public Switched Telephone Network (PSTN), Global System for Mobile communication (GSM) network, IP Multimedia Subsystem (IMS) network, or a hybrid network. Routing system 200 includes a router 202. In this example, router 202 is a session initiation protocol (SIP) server which performs, among other functions, routing and security functions for its resident network. Those skilled in the art will appreciate, however, that router 202 may be any device that performs routing or security functions for any type of network. For example, router 202 may be or include an IP multi-media subsystem (IMS) module, a presence server, a softswitch, an IP router, or a firewall.

Also included in routing system 200 is user profile database 204. Typically, each subscriber to a network has a user profile which may define, for example, the services a subscriber is authorized to use and how that subscriber will be charged for those services. User profile database 204 stores such user profiles.

Additionally, routing system 200 includes policy database 206, which stores one or more policies associated with the network and generated in accordance with the subject matter disclosed herein. A policy is a set of rules to be applied in performing a function of a network. Policies stored in policy database 206 may govern, among other functions, one or more routing and security functions provided by router 202. For example, when router 202 receives SIP message 208, router 202 first determines which policy (or policies) to apply in performing a requested function. In determining which policy to apply, router 202 may check one or more attributes of SIP message 208, or router 202 may pull attributes from a user profile associated with SIP message 208. Then, router 202 applies the policy, possibly in conjunction with SIP message or user profile attributes, to perform function such as allowing access to the IMS network, altering SIP message 208, or routing SIP message 208. The storage of a policy in policy database 206 may include, for example, the storage of a policy definition, data associated with the policy definition, or a data structure, such as a routing table.

When implementing a policy in accordance with the subject matter disclosed herein, one or more of the stages outlined in development cycle 100 may be bypassed. Thus, implementing a policy in accordance with the subject matter disclosed herein, rather than implementing a policy in accordance with the traditional development cycle 100, may reduce the time and cost typically required. This is important because as the network of routing system 200 rapidly evolves, routing system 200 must also evolve. Implementing policies in accordance with the subject matter disclosed herein facilitates the ability of routing system 200 to evolve in step with the network.

Figure 3:
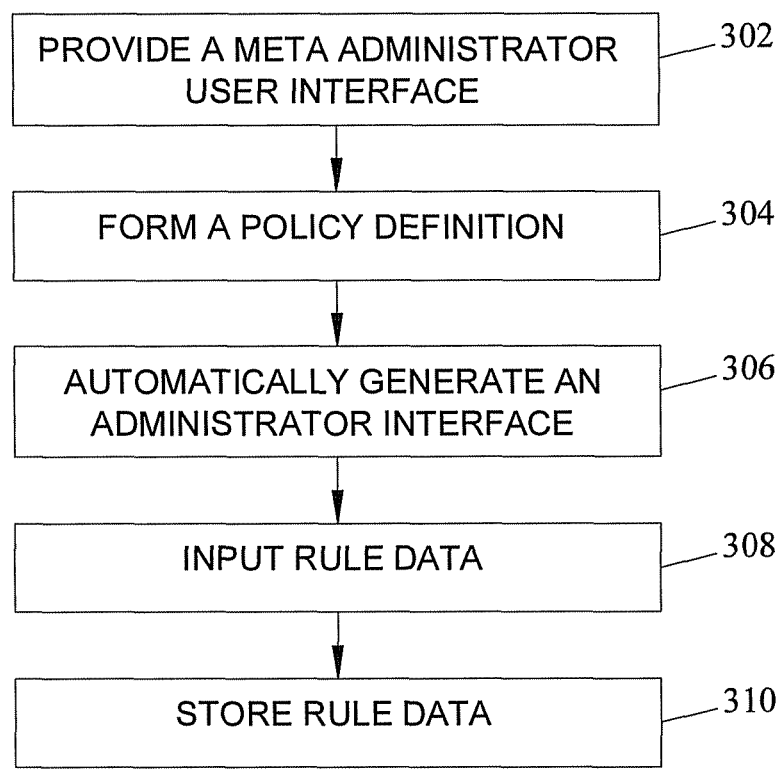
FIG. 3 is a flow chart illustrating a method for implementing a policy for a router in accordance with an embodiment of the subject matter disclosed herein.

FIG. 3 is a flow chart illustrating a method for implementing a policy for a router, such as router 202 in FIG. 2, in accordance with an embodiment of the subject matter disclosed herein. In step 302, a meta administrator (MA) interface is provided. The MA interface is configured to facilitate the specification of one or more rules that form the policy definition of the policy. The MA interface may be provided as a graphical user interface (GUI) such that a meta administrator may specify the one or more rules without viewing or altering computer code. In step 304, a meta administrator specifies the one or more rules that form the policy definition using the meta administrator interface. Specifying the one or more rules may include specifying a trigger point, specifying one or more conditions, or specifying one or more actions of the policy. Furthermore, the one or more conditions may include a session initiation protocol (SIP) message attribute or a user profile attribute. Even further, the one or more actions may include routing a call via the router, or generating, altering, or forwarding a SIP message. An example of a triggering point in the telecommunications context is when to execute a feature (e.g., for every incoming call, when the called party is not responding, etc.) Another example of a policy that may be set using the meta administrator interface is the order of features, including which feature takes precedence over other features and whether a feature is domain dependent or not. An example of conditions that may be set using the meta administrator interface include what parameters to check in a SIP message, in global/domain/user attributes, or in the results of previous features. An example of actions that may be defined using the meta administrator interface include modifying the request URI, forwarding the message, sending a SIP reply, inserting/removing SIP headers, setting attributes for further processing, etc.

In step 306, an administrator interface is automatically generated based on the policy definition formed in step 304. The administrator interface is provided for inputting rule data associated with the policy definition. Furthermore, the administrator interface may be provided as a GUI to facilitate the administrator in inputting rule data. Even further, the administrator interface may restrict the administrator's ability to affect the router or the routing system. In step 308, the administrator inputs rule data associated with the policy definition.

In step 310, the rule data input by the administrator in step 308 is stored in one or more data structures associated with the router. The one or more data structures may be automatically generated based on the policy definition. Alternatively, the one or more data structures may be pre-existing data structures. Furthermore, the one or more data structures may also be associated with other routers or routing systems. Thus, a policy may be usable by more than one router or routing system. In one example, the one or more data structures are routing tables.

Those skilled in the art will appreciate that use of the MA interface and administrator interface may not be limited to a meta administrator or an administrator. Furthermore, a meta administrator and an administrator may be the same person. In addition, policy definitions made for one system made by one meta administrator in one environment using meta administrator interface 410 can be communicated to another meta administrator in another environment for implementation on the receiving meta administrator's router or other node. For example, a telecommunications equipment provider may create a policy using meta administrator interface 410, which results in automatic generation of a corresponding administrator interface 412. The telecommunications equipment provider may then communicate the automatically generated administrator interface 412 to its customer (i.e., a telecommunications service provider), and the customer may use the administrator interface to automatically populate its data structures with any new rules. Alternatively, the telecommunications equipment provider may populate rules using the automatically generated administrator interface 412 using data provided by its customer and export the corresponding populated data structures to the customer for execution on the customer's network node.

Figure 4A:
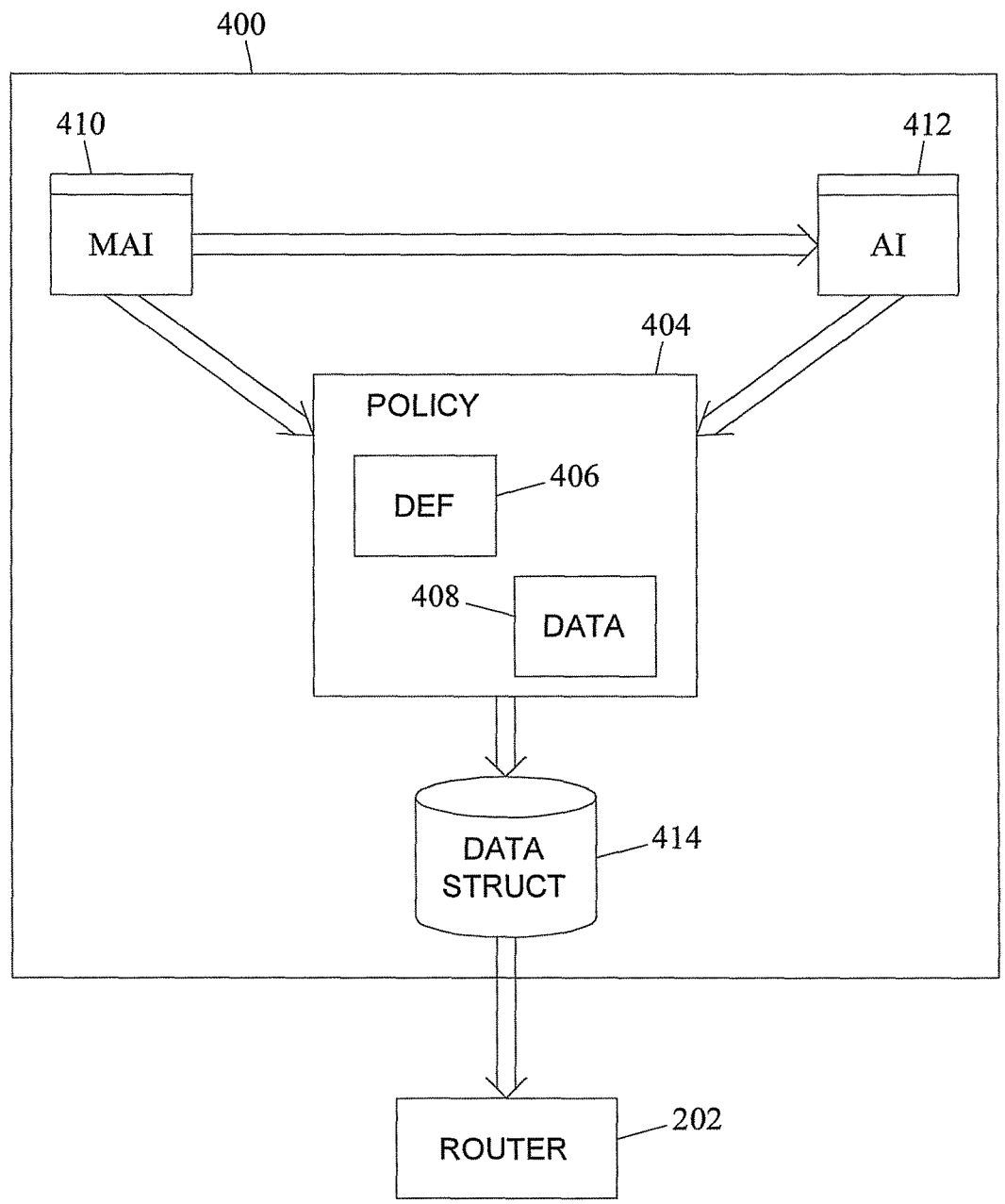
FIG. 4A is a block diagram illustrating a system for implementing a policy for a router according to an embodiment of the subject matter disclosed herein.

FIG. 4A illustrates a system 400 for implementing a policy for a router according to an embodiment of the subject matter disclosed herein. In this example, system 400 is used to create and implement policy 404 on router 202, which was described above with reference to FIG. 2. Although router 202 is used in this example, those skilled in the art will appreciate that the target router may be any routing device known in the art.

System 400 includes a meta administrator (MA) interface 410, which facilitates a meta administrator, or a user of MA interface 410, in the formation of policy definition 406 of policy 404. A policy definition is an un-provisioned set of one or more rules. Accordingly, MA interface 410 is configured to facilitate the meta administrator in specifying the one or more rules that form policy definition 406. For example, MA interface 410 may include a graphical user interface (GUI) so that, in forming policy definition 406, the meta administrator does not have to view or alter computer code. Rather, the meta administrator may manipulate pull-down menus, text boxes, and other well known GUI devices to form policy definition 406.

System 400 also includes an administrator interface 412. Administrator interface 412 is configured to facilitate an administrator, or a user of administrator interface 412, in provisioning policy 404 with rule data 408. For example, a part of a policy definition may include a call for "country code," and the administrator may provide "USA" as rule data associated with that policy definition. Furthermore, administrator interface 412 is automatically generated based on policy definition 406 formed by MA interface 410. That is, once policy definition 406 is defined, system 400 is then able to automatically generate the structure of administrator interface 412. The structure of administrator interface 412 may include specification of the rule data necessary for policy 404, and the types of rule data allowed to be input by an administrator. Then, when the administrator decides to provision policy 404 with rule data 408, administrator interface 412 is ready for use. In addition, administrator interface 412 may include a GUI to facilitate the input of rule data 408 associated with policy definition 406. The GUI of administrator interface 412 may also restrict the ability of the administrator to affect system 400 or any associated systems.

Additionally, system 400 includes one or more data structures 414. Data structure 414 is configured to store rule data 408 input by an administrator. Data structure 414 may be automatically generated based on policy definition 406. That is, once policy definition 406 is defined, system 400 may then be able to automatically generate data structure 414 to store rule data 408. Alternatively, data structure 414 may be a pre-existing data structure. Furthermore, data structure 414 is associated with router 202, and also may be associated with other routers. Accordingly, data structure 414 may be any type of data structure able to store rule data 408 for use by router 202. For example, if policy 404 is a routing feature, then data structure 414 may be a routing table. If policy 404 is a security feature configured to restrict access for certain subscribers (a blacklist), then data structure 414 may be a list of restricted subscribers. Referring back to FIG. 2, data structure 414 may reside in policy database 206.

In FIG. 4A, system 400 may be hardware, software, or firmware that executes on router 202 to allow policies to be easily defined and updated for router 202. In an alternate implementation, system 400 may be implemented on a computer, such as a management system that is separate from router 202. In such an implementation, the policies would be defined by system 400 and communicated to router 202 for implementation.

Figure 4D:
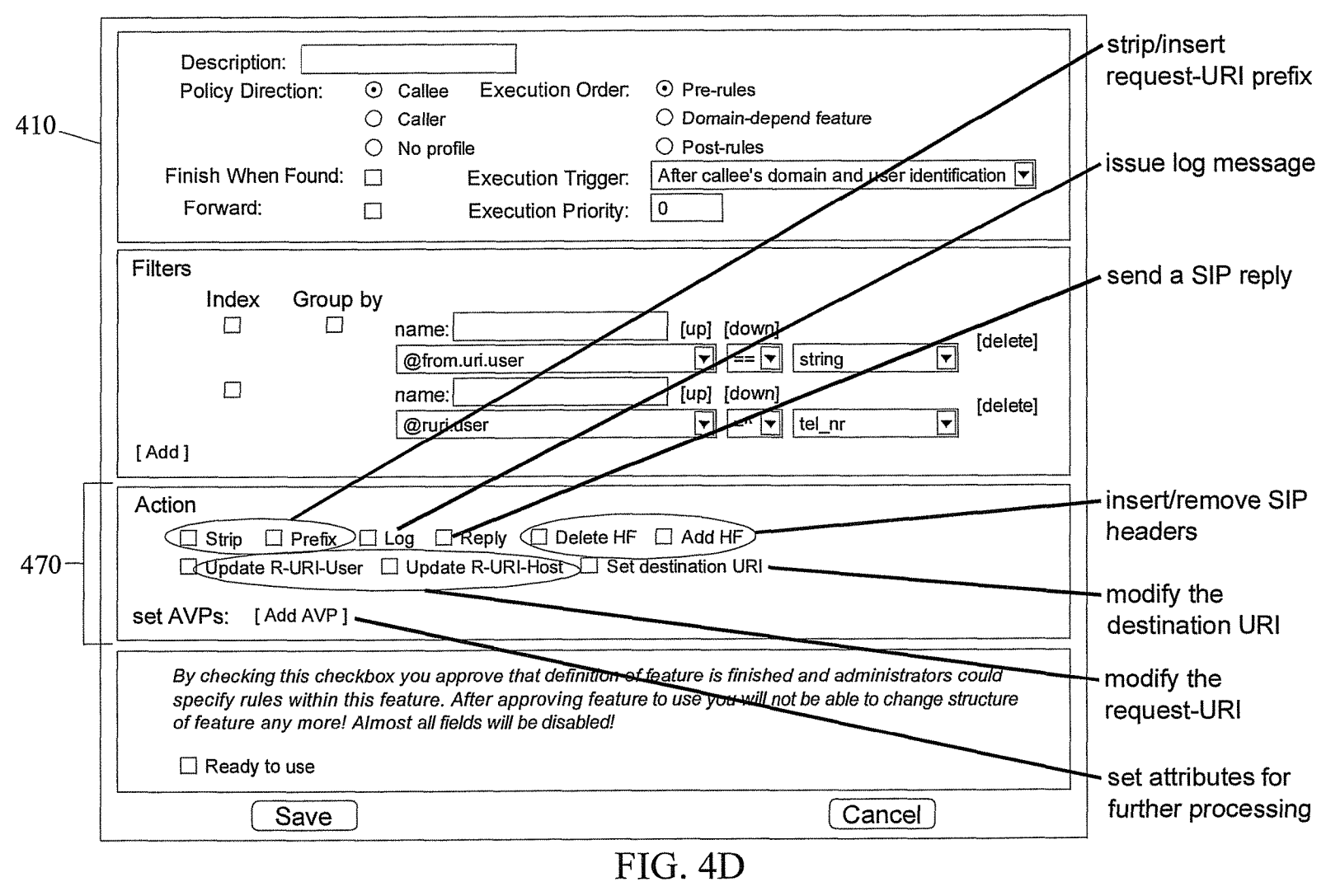

FIGS. 4B-4D illustrate various examples of graphical user interface devices that may be included in a meta administrator interface 410 according to an embodiment of the subject matter described herein. Referring to FIG. 4B, an exemplary meta administrator interface 410 includes a first group of graphical user interface devices 450 that allow the user to specify the name of the feature, domain dependency of the feature, a triggering point, the order of features, the inbound/outbound domain and user profile, and final actions. In FIG. 4C a second group of graphical user interface devices 460 allows the meta administrator to specify various filters to be filtered on SIP message attributes. The user can specify the name of the filter criteria, the part of the SIP message that is filtered, the global/domain/ user attribute, or the result of a previous feature. Filter criteria interface devices 460 also include graphical user interface devices that allow a user to specify a comparison method and value type. In FIG. 4D, area 470 of meta administrator interface 410 allows the user to specify actions to be performed. In the illustrated example, the actions include strip/insert request-URI prefix, issue a message to a message log, send a SIP reply, insert/remove SIP headers, modify the destination URI, modify the request URI, and set attributes for further processing.

As stated above, once the meta administrator creates a policy using meta administrator interface 410, a feature specific administrator is generated. The administrator interface allows the user to set values for specific rules and have those values automatically populated into data structures associated with a network node, such as a router. Each feature may have a different, feature specific administrator GUI page that is automatically generated by the meta administrator interface 410. Provisioning can be performed for each domain separately or may be performed globally. FIG. 4E illustrates one example of an administrator interface 412 that is automatically generated using a meta administrator interface 410. In FIG. 4E, the automatically generated graphical user interface includes conditions and actions that were defined by the meta administrator using meta administrator interface 410 and corresponding boxes for the user to fill in values for the fields. A table at the bottom of the meta administrator interface 412 allows the user to view and edit rules for which data values have been populated.

A detailed example of how system 400 may be used to implement a policy for a router is here provided. In this example, the network provider has decided to implement an origin-based routing feature on a SIP server. Origin-based routing routes a received SIP message to another server based on the source IP address (e.g., a caller's IP address) and the method type of the message (e.g., "INVITE" or "NOTIFY"). More specifically, if the source IP address of the message matches the address of a peering partner, then the server marks the message with a header indicating such. Then, the server forwards the message according to the method type of the message. Typically, a peering partner is a server that is in the subscriber's network or a server with which the subscriber's network has a favorable agreement.

FIG. 5 shows MA interface 410 used to facilitate a meta administrator in forming the policy definition for the origin-based routing feature in accordance with an embodiment of the subject matter disclosed herein. As shown in FIG. 5, MA interface 410 is represented as a graphical user interface (GUI). The meta administrator uses MA interface 410 to specify one or more rules that form the policy definition. Specifically, in this example the policy definition includes rules that specify a trigger point, one or more conditions, and one or more actions. More specifically, MA interface 410 includes graphical user interface devices 450, 460, and 470 for specifying a policy.

The meta administrator may set the trigger point via trigger point generation device 502 of graphical user interface devices 450. The trigger point defines when the policy is to execute (e.g., upon receiving an incoming call, or when a called party does not respond). In this case, trigger point generation device 502, a pull-down menu which lists one or more trigger point options, may be manipulated to set the trigger point. Here, the meta administrator has manipulated trigger point generation device 502 such that the policy executes at the beginning of the routing process. Other factors related to the trigger point, such as the order of execution, may be set via the trigger point generation device 502.

The meta administrator may generate one or more filters or conditions via filter criteria interface devices 460. There are two conditions for this example policy for the origin-based routing feature: the source IP address and the method type of the message. Those skilled in the art will appreciate that the condition generators and GUI devices may be set in any order desired. For the first condition in this example, a first filter interface generator 508 is set such that the SIP server checks the source IP address against an IP address correlating to a peering partner. The meta administrator may accomplish this task by the GUI devices as shown in FIG. 5. As shown in FIG. 5, the identifier of the condition is set to "source IP address." The actual source IP address to be searched is set to "@src.ip," which instructs the SIP server to check the source IP address of the incoming SIP message for comparison to peering partner addresses. The filter criteria being defined may be manipulated to choose an operator (e.g., "==", "<", or "=~"). In this case, the operator is set to "==" so that the SIP server checks the source IP address for an exact match to a peering partner address. Finally, the first filter 508 may be set to choose the type of rule data that an administrator may enter for comparison to the source IP address. In this case, the administrator will only be allowed to enter an IP address as rule data for this condition. Now that first filter 508 is set, the meta administrator may define a second filter 510. As shown in FIG. 5, the meta administrator manipulates GUI devices of second filter interface generator 510 to create the "method type" condition such that the SIP server is instructed to pull the method type attribute from the message and check for a match with rule data entered by the administrator.

The meta administrator may generate one or more actions, via action GUI devices 470, to be performed if the conditions of the policy definition are met. In this example, GUI devices 470 include a series of check-boxes, which allow the meta administrator to choose the actions to be performed. Here, the "Add HF" box is marked so that the SIP server adds a new header to the message. Furthermore, the "update R-URI-Host" box is marked so that the SIP server updates the host part of the request URI according to the method type. Additionally, one of action GUI devices 470 is marked so that the message is forwarded to its destination.

Figure 6:
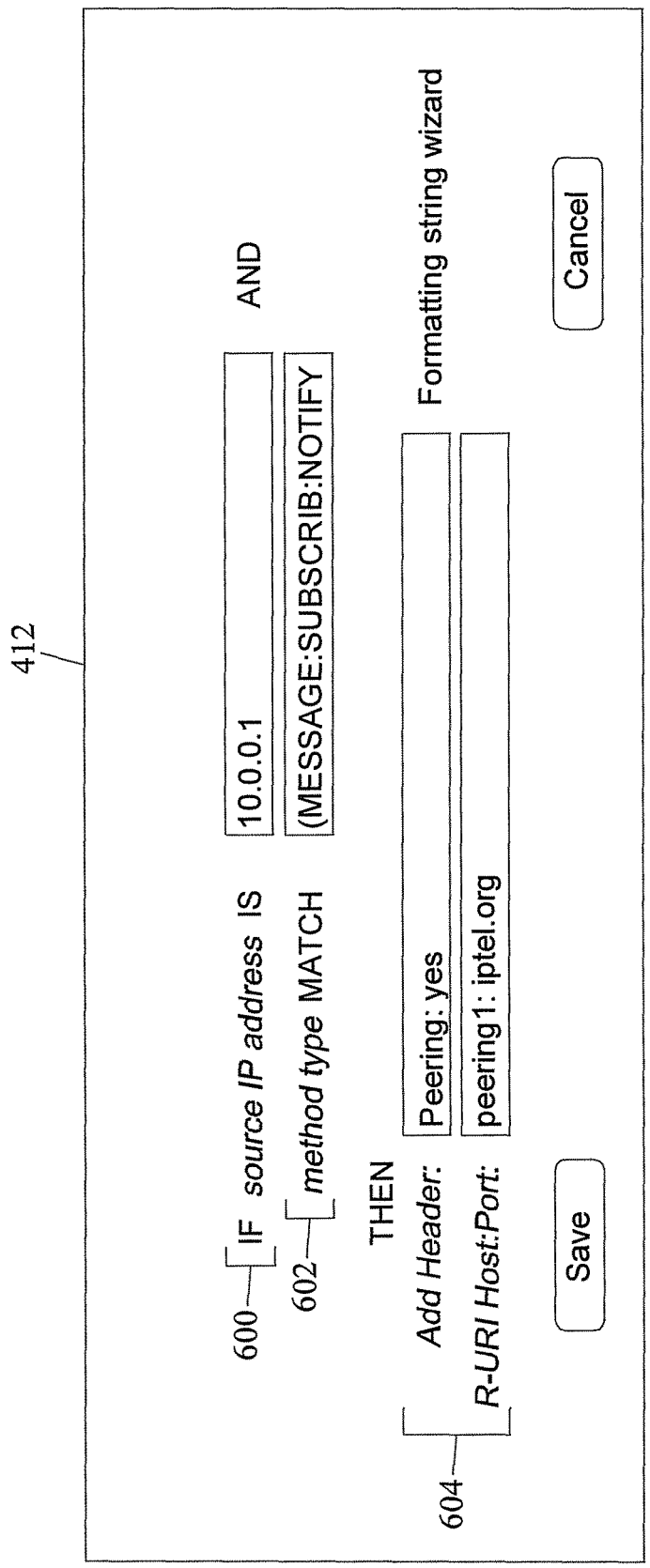
FIG. 6 is a computer screen shot illustrating an administrator interface automatically generated based on the policy definition formed via the meta administrator interface shown in FIG. 5 in accordance with an embodiment of the subject matter disclosed herein.

FIG. 6 illustrates administrator interface 412 in accordance with an embodiment of the subject matter disclosed herein. Administrator interface 412 is automatically generated based on and specific to the policy definition formed via MA interface 410. Also, administrator interface 412 is configured to facilitate an administrator in inputting rule data associated with the policy definition. Furthermore, administrator interface 412 is represented as a GUI in FIG. 6.

Administrator interface 412 includes first field population device 600 and second filed population device 602, which are generated based on the policy definition formed via MA interface 410. More specifically, first and second condition field population devices are generated based on filter interface generators 508 and 510. Field population devices 600 and 602 are GUI devices that allow the administrator to input rule data associated with the policy definition. In this example, one GUI device allows the administrator to input an IP address of a peering partner to be compared to the source IP address of a received message. Similarly, another GUI device allows the administrator to input a method type to compare to the method type of the received message. The input IP address and the input method type are rule data associated with the policy definition.

Furthermore, administrator interface 412 includes action definition user interface devices 604, which are generated based on the policy definition formed via MA interface 410.

More specifically, action definition user interface devices 604 are generated based on the actions selected by the user via GUI devices 470. Action definition user interface devices 604 allow the administrator to input rule data associated with the policy definition. More specifically, one GUI device allows the administrator to input a header to be added to a received message when the specified conditions are met. Similarly, another GUI device allows the administrator to input a host name with optional port number to set as the R-URI host when the specified conditions are met. In this example, the GUI of administrator interface 412 have been set to provision the policy such that if the source IP address is "10.0.0.1" and the method type is either "MESSAGE," "SUBSCRIBE," or "NOTIFY" then a new header "Peering: yes" is added and the R-URI host port is set to "peering1.iptel.org."

Figure 7:
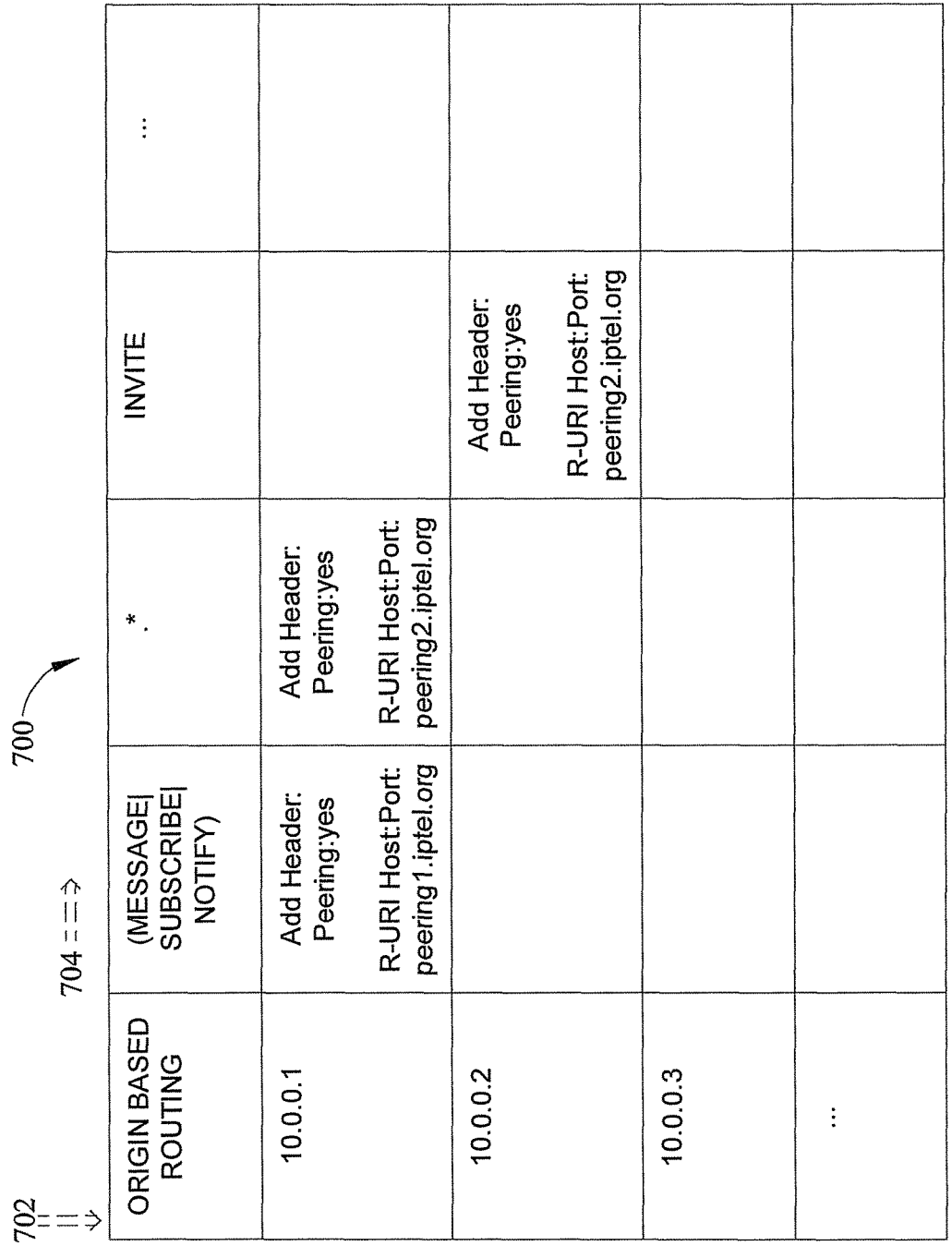
FIG. 7 is a table illustrating a data structure configured to store rule data input via the administrator interface shown in FIG. 6 in accordance with an embodiment of the subject matter disclosed herein.

FIG. 7 illustrates a data structure 700 configured to store rule data input via administrator interface 412 in accordance with an embodiment of the subject matter disclosed herein. In this example, data structure 700 is automatically generated, without stored rule data, based on the policy definition formed by MA interface 410. Alternatively, data structure 700 may be a pre-existing data structure. In that case, a portion of data structure 700 may be reserved for use with the policy definition for the origin-based routing feature.

The policy definition formed by MA interface 410 for the origin-based routing feature includes two conditions, and data structure 700 is thus generated as a two-dimensional matrix. Similarly, a policy definition having n conditions may be generated as an n-dimensional matrix. Those skilled in the art, however, will appreciate that any type of data structure may be used in place of data structure 700. For example, data structure 700 may instead be a routing table, a tree, or a linked list.

Data structure 700, as a two-dimensional matrix, includes a header column 702 and a header row 704. Header column 702 and header row 704 store condition rule data. In this example, header column 702 stores rule data associated with first condition definition 608 and header row 704 stores rule data associated with second condition definition 618. Alternatively, header column 702 and header row 704 may be pre-provisioned with condition rule data. The blocks to the right of header column 702 and below header row 704 store action rule data. In this example, each of these blocks store rule data associated with first and second action definitions 620, 622. Specifically, with reference to the example shown in FIG. 6, action rule data 706 is indexed by first condition rule data "10.0.0.1" and second condition rule data "(MESSAGE|SUBSCRIBE|NOTIFY)." Thus, action rule data 706 includes instructions to add a new header "Peering: yes" and to set the R-URI host port to "peering1.iptel.org." The instructions serving as action rule data may be any type of instructions known to those skilled in the art. Furthermore, the instructions may be executable by a router, such as a SIP server. For example, the instructions may be executable code, a link to executable code, or a routing table.

FIG. 8 illustrates another example where meta administrator interface 410 is used to provision a policy for request URI to gateway name mapping according to an embodiment of the subject matter described herein. In this example, feature is called least cost routing. The feature is defined as a domain dependent feature indicating that the feature will be only applied to certain user's domain. An execution trigger is specified indicating that the caller is identified before the feature will be examined. In the filter section of meta administrator interface 410, a value is specified to look up the user part of the request URI with the longest prefix match. In the action of portion of meta administrator interface 410, a destination gateway name is specified. FIG. 9 illustrates the corresponding automatically generated administration screen. In FIG. 9, conditions are set such that if the called number begins with a certain prefix, a SIP header with the value of "international" is added, which can be used for charging purposes, and the destination gateway of West-Europe is specified. In the table in the bottom part of FIG. 9, additional least cost routing rules are specified for different prefixes. The domain to which the least cost routing rule is applied is test1.iptel.org.

FIG. 10 illustrates another example where meta administrator interface 410 is used to automatically populate a gateway name to SIP URI mapping. In FIG. 10, the feature is defined to be applied after the gateway name has been set. The gateway name is specified in the filters portion of meta administrator interface 410. The action portion of meta administrator interface 410 allows the user to set the destination URI in the request that is forwarded. FIG. 11 illustrates the corresponding automatically generated administration interface 412. In FIG. 11, it is specified that if the gateway name is USA, then the destination URI is SIP: 10.0.0.1:5070. The table at the bottom of meta administrator interface 412 specifies different combinations of gateway names and destination URIs.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method for implementing a policy for a router, the method comprising:
providing a meta administrator interface configured to facilitate specification of one or more rules that form a policy definition, wherein the meta administrator interface is configured to provide user interface elements for defining one or more conditions and one or more actions, wherein the one or more conditions includes an origin-based routing policy definition that includes a trigger point for triggering the origin-based routing feature and routing conditions associated with the origin-based routing feature, wherein the routing conditions include a source Internet protocol (IP) address and a method type of a session initiation protocol (SIP) message, wherein the routing conditions include a filter for identifying when to perform the one or more actions, and wherein the filter defines a SIP message attribute that is to be compared, a comparison operator, and a type of rule data for comparing to the SIP message attribute;
automatically generating, based on the one or more rules that form the policy definition, an administrator interface for inputting rule data associated with the policy definition, wherein the administrator interface is configured to include conditions and actions defined using the meta administrator interface and to provide user interface elements for inputting rule data associated with the one or more conditions and the one or more actions, and wherein at least one of the user interface elements provided by the administrator interface is for inputting the rule databased on the type of rule data defined by the filter; and
storing the rule data in one or more data structures associated with a router.

2. The method of claim 1, wherein automatically generating an administrator interface includes automatically generating an administrator graphical user interface (GUI) screen.

3. The method of claim 1, wherein the meta administrator interface comprises a meta administrator graphical user interface (GUI) screen.

4. The method of claim 1, wherein the one or more data structures are automatically generated based on the policy definition.

5. The method of claim 1, wherein the one or more data structures comprise routing tables.

6. The method of claim 1, wherein the specification of one or more rules comprises the specification of a trigger point for the policy.

7. The method of claim 1, wherein the specification of one or more rules comprises the specification of a condition of the policy.

8. The method of claim 7, wherein the condition is one of a user/domain/global profile attribute or output of a previously executed policy.

9. The method of claim 1, wherein the specification of one or more rules comprises the specification of an action of the policy.

10. The method of claim 9, wherein the action comprises routing a call via the router, altering routed messages, or providing input for further policies.

11. The method of claim 1, wherein the router comprises a SIP server.

12. The method of claim 1, wherein the policy comprises a routing feature.

13. The method of claim 1 wherein storing the rule data in one or more data structures associated with a router includes exporting the administrator interface or the rule data to a third party and wherein the third party uses the administrator interface or the rule data to update the third party's router.

14. A system for implementing a policy for a router, the system comprising:
a meta administrator interface configured to facilitate specification of one or more rules that form a policy definition, wherein the meta administrator interface is configured to provide user interface elements for defining one or more conditions and one or more actions, wherein the one or more conditions includes an origin-based routing policy definition that includes a trigger point for triggering the origin-based routing feature and routing conditions associated with the origin-based routing feature, wherein the routing conditions include a source Internet protocol (IP) address and a method type of a session initiation protocol (SIP) message, wherein the routing conditions includes a filter for identifying when to perform the one or more actions, wherein the filter defines a SIP message attribute that is to be compared, a comparison operator, and a type of rule data for comparing to the SIP message attribute, and wherein the meta administrator interface is implemented using a processor and a memory;
an administrator interface automatically generated based on the one or more rules that form the policy definition and configured to facilitate the input of rule data associated with the policy definition, wherein the administrator interface is configured to include conditions and actions defined using the meta administrator interface and to provide user interface elements for inputting rule data associated with the one or more conditions and the one or more actions, and wherein at least one of the user interface elements provided by the administrator interface is for inputting the rule data based on the type of rule data defined by the filter; and
wherein the administrator interface populates one or more data structures associated with a router with the rule data.

15. The system of claim 14, wherein the administrator interface comprises an administrator graphical user interface (GUI) screen.

16. The system of claim 14, wherein the meta administrator interface comprises a meta administrator graphical user interface (GUI) screen.

17. The system of claim 14, wherein the one or more data structures are automatically generated based on the policy definition.

18. The system of claim 14, wherein the one or more data structures comprise routing tables.

19. The system of claim 14, wherein the specification of one or more rules comprises the specification of a trigger point for the policy.

20. The system of claim 14, wherein the specification of one or more rules comprises the specification of a condition of the policy.

21. The system of claim 20, wherein the condition is one of a user/domain/global profile attribute or output of a previously executed policy.

22. The system of claim 14, wherein the specification of one or more rules comprises the specification of an action of the policy.

23. The system of claim 22, wherein the action comprises routing a call via the router, altering routed messages, or providing input for further policies.

24. The system of claim 14, wherein the router comprises a SIP server.

25. The system of claim 14, wherein the policy comprises a routing feature.

26. The system of claim 14 wherein the administrator interface or the rule data is exported to a third party and wherein the third party uses the administrator interface or the rule data to update the third party's router.

27. A non-transitory computer readable medium having stored thereon computer-executable instructions that when executed by a processor of a computer control the computer to perform steps comprising:
providing a meta administrator interface configured to facilitate specification of one or more rules that form a policy definition, wherein the meta administrator interface is configured to provide user interface elements for defining one or more conditions and one or more actions, wherein the one or more conditions includes an origin-based routing policy definition that includes a trigger point for triggering the origin-based routing feature and routing conditions associated with the origin-based routing feature, wherein the routing conditions include a source Internet protocol (IP) address and a method type of a session initiation protocol (SIP) message, wherein the routing conditions includes a filter for identifying when to perform the one or more actions, and wherein the filter defines a SIP message attribute that is to be compared, a comparison operator, and a type of rule data for comparing to the SIP message attribute;
automatically generating, based on the one or more rules that form the policy definition, an administrator interface for inputting rule data associated with the policy definition, wherein the administrator interface is configured to include conditions and actions defined using the meta administrator interface and to provide user interface elements for inputting rule data associated with the one or more conditions and the one or more actions, and wherein at least one of the user interface elements provided by the administrator interface is for inputting the rule data based on the type of rule data defined by the filter; and storing the rule data in one or more data structures associated with a router.

* * * * *